Dec. 27, 1955    R. N. CLIFTON ET AL    2,728,268
CONCAVITY GENERATING MILLING MACHINE
Filed July 21, 1951    7 Sheets-Sheet 1

INVENTORS
RICHARD N. CLIFTON
MILTON V. WATERS
PETER T. OCHOTSCHINSKY
BY
H. K. Parsons + L. W. Wright.
ATTORNEYS Dec. 27, 1955  R. N. CLIFTON ET AL  2,728,268
CONCAVITY GENERATING MILLING MACHINE
Filed July 21, 1951  7 Sheets-Sheet 2

Fig. 3.

INVENTORS
RICHARD N. CLIFTON
MILTON V. WATERS
PETER F. OCHOTSCHINSKY
BY H. K. Parsons & L. W. Wright
ATTORNEYS Dec. 27, 1955  R. N. CLIFTON ET AL  2,728,268
CONCAVITY GENERATING MILLING MACHINE
Filed July 21, 1951  7 Sheets-Sheet 3

INVENTOR.
RICHARD N. CLIFTON
MILTON V. WATERS
PETER F. OCHOTSCHINSKY
BY
H. H. Parsons + L. W. Wright
ATTORNEYS Dec. 27, 1955    R. N. CLIFTON ET AL    2,728,268
CONCAVITY GENERATING MILLING MACHINE
Filed July 21, 1951    7 Sheets-Sheet 4

INVENTORS
RICHARD N. CLIFTON
MILTON V. WATERS
PETER F. OCHOTSCHINSKY
BY
H. K. Parsons & L. W. Wright
ATTORNEYS

Fig. 11.

United States Patent Office 2,728,268
Patented Dec. 27, 1955

2,728,268

CONCAVITY GENERATING MILLING MACHINE

Richard N. Clifton, Milton V. Waters, and Peter F. Ochotschinsky, Cincinnati, Ohio, assignors to The Cincinnati Milling Machine Co., Cincinnati, Ohio, a corporation of Ohio Application July 21, 1951, Serial No. 237,952

3 Claims. (Cl. 90—15)

This invention relates to milling machines for forming other than plane surfaces by generating methods.

One of the objects of this invention is to provide a new and improved machine for automatically cutting by generation a concave surface in a work piece.

Another object of this invention is to provide a machine for milling a series of concave combustion chambers in cylinder blocks in such a manner that one-half of the cavities are formed at one setting of the work piece and the other half formed at a second setting of the work piece.

A further object of this invention is to provide an improved automatic cycle control mechanism for effecting and controlling a generating movement of the cutter of a milling machine in a manner to completely cut or form a three-dimensional work surface in a single automatic cycle.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

Referring to the drawings in which like reference numerals indicate like or similar parts.

In general, the construction of a machine embodying the principles of this invention is such that the top of the bed serves as a fixed work support with the work arriving on a roller conveyor fixed to one end of the bed. Mechanism is provided in the bed for positioning the work in one position for the subsequent formation of one group of concavities, and then the operator moves the work piece to a second position at which a second group of concavities is formed, and then the work piece is moved out of the machine onto a conveyor at the other end of the bed. A plurality of cutter spindles are mounted on a vertically slidable ram in individual quills which support the spindles at such an angle to the vertical that circular cutters attached thereto, have their cutting circle tangent at an angle to the axis of the work about which the concavity is to be generated. The cutting operation is completed in an automatic cycle at the end of which the operator either shifts the position of the work for a second operation or, if the second operation has been performed, the work piece is replaced by a new one.

Figure 3:
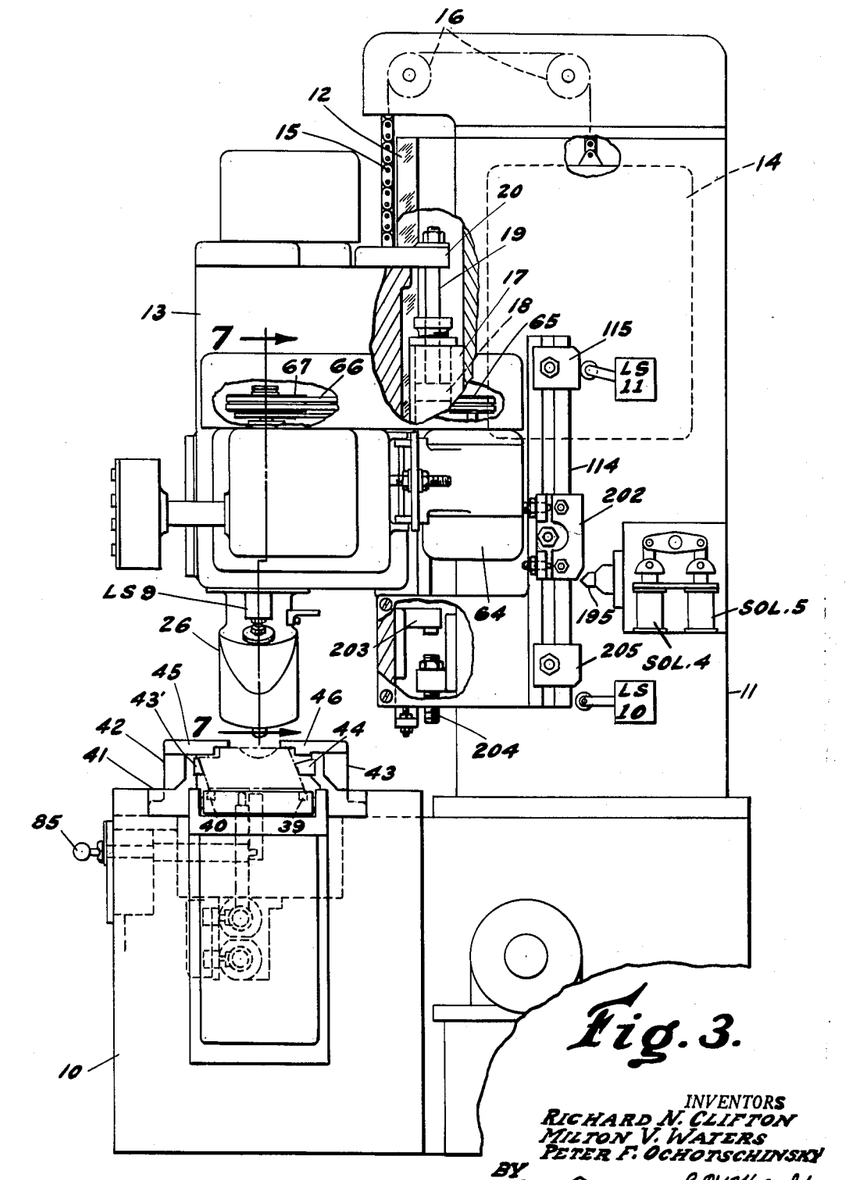
Figure 3 is a side elevational view of the machine shown in Figure 1 and as viewed from the right of that figure.
Figure 7:
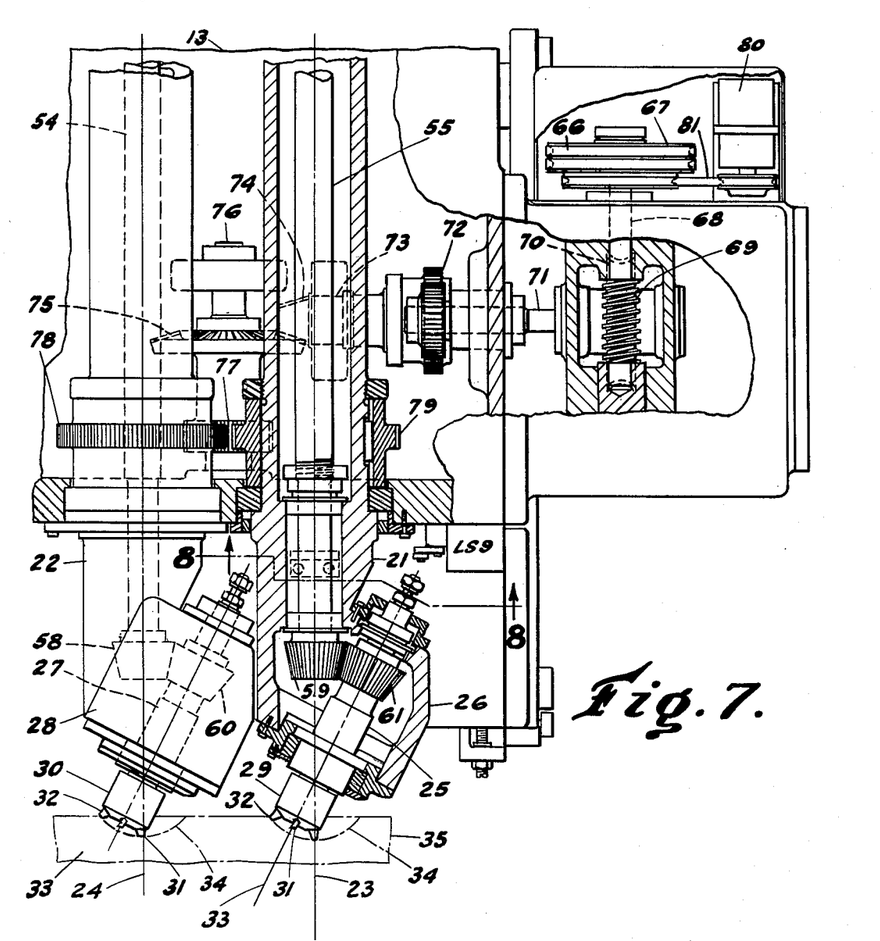
Figure 7 is a front elevational view of the cutter spindles and partly in section as viewed on line 7—7 of Figure 3.

Referring now to the drawings, the reference numeral 10 indicates the bed of the machine at the rear of which, as shown in Figure 3, uprises a column 11. This column has vertical guideways 12 formed thereon for receiving and guiding a vertically movable ram 13 which is partially balanced by a counterweight 14 which is connected to the ram by chains 15 passing over pulleys 16 rotatably journaled in the top of the column. The ram 13 is actually moved up and down by means of a piston and cylinder shown in Figure 3, the cylinder 17 of which is fixed with the column, and the piston 18 connected by a piston rod 19 to the top of the ram 13 by means of bracket 20. As shown in Figure 7, the ram carries a pair of rotatable quills 21 and 22 journaled therein for rotation about vertical axes 23 and 24 respectively. The quill 21 has a cutter spindle 25 rotatably mounted in the head 26 and likewise the quill 22 has a cutter spindle 27 rotatably mounted in the head 28 formed on the end of the carrier. The cutter spindles have circular cutters 29 and 30 attached thereto, and each cutter has a plurality of cutting teeth such as 31 and 32, and the axis 33 of the spindle is so inclined with respect to the axis 23 of the quill that the cutting circle of the teeth is tangent at an angle to the axis 23. This will determine the depth of the cavity such as indicated by the dotted line 34 in Figure 7 in the work piece 35.

Figure 4:
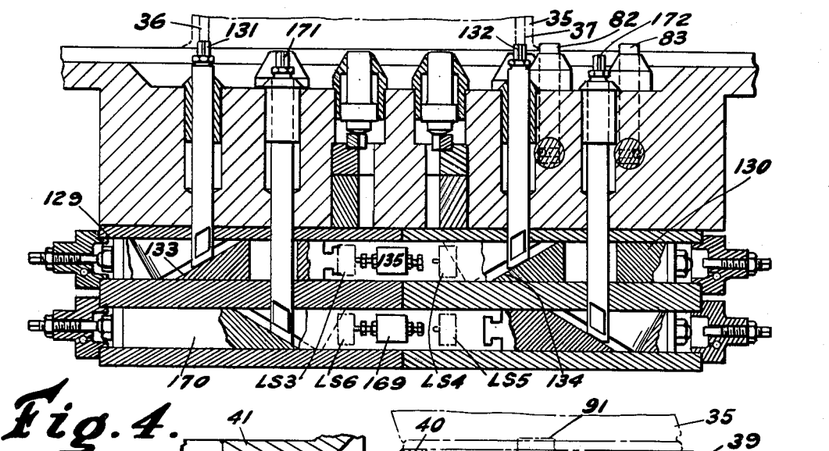
Figure 4 is a vertical section through the work support as viewed on the line 4—4 of Figure 2.

The work is positioned, as shown in Figure 7, in such relation to the axes 23 and 24 that they will intersect the surface of the work at points which represent the center of the circular concavity to be formed in the work. As shown in Figure 4, the work piece 35 comes to the machine from the conveyor 38 with a pair of predrilled holes 36 and 37 in the bottom of the work piece, and these holes are utilized for positioning the work so as to form the concavities in definite relation with respect to these holes and the axes 23 and 24. In the top of the bed, as shown in Figures 2 and 5, are fixed a pair of work supporting and guiding rails 39 and 40.

Figures 5, 6:
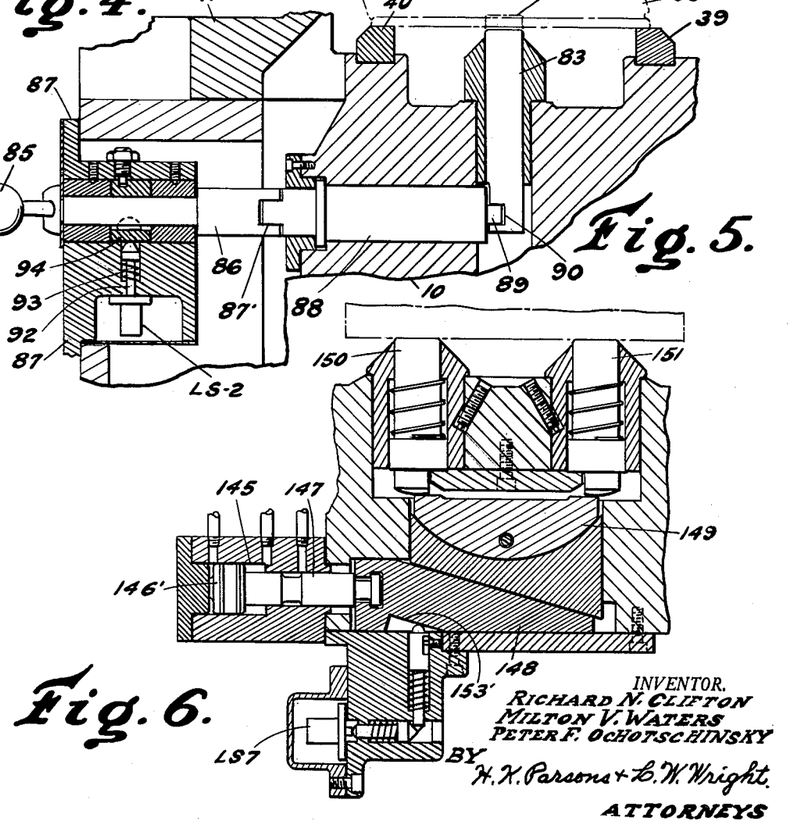
Figure 5 is a detail section of the clamping mechanism as viewed on the line 5—5 of Figure 1.
Figure 6 is a vertical section through the work support as viewed on the line 6—6 of Figure 2.

From Figures 3 and 5 it will be noted that these rails are located at the bottom of a trough formed in the work fixture 41 which has upstanding sides 42 and 43 in which are fixed a second pair of guide rails 43′ and 44 for laterally guiding and positioning the work. Fixedly mounted on the top of the sides 42 and 43 is a pair of clamping rails 45 and 46 which are of such height as to clear the work as it slides in on rails 39 and 40 but are sufficiently rigid that after the work has been moved into its correct position and located by means of the predrilled holes 36 and 37, the work piece may be raised against the clamping rails 45 and 46 and solidly held in position thereagainst during the milling operation. After the first machining operation, the work is unclamped and slid along the trough to a second position in which it is again located by means of the locating holes 36 and 37 and clamped against the plates 45 and 46 for a second machining operation.

Figures 1, 2:
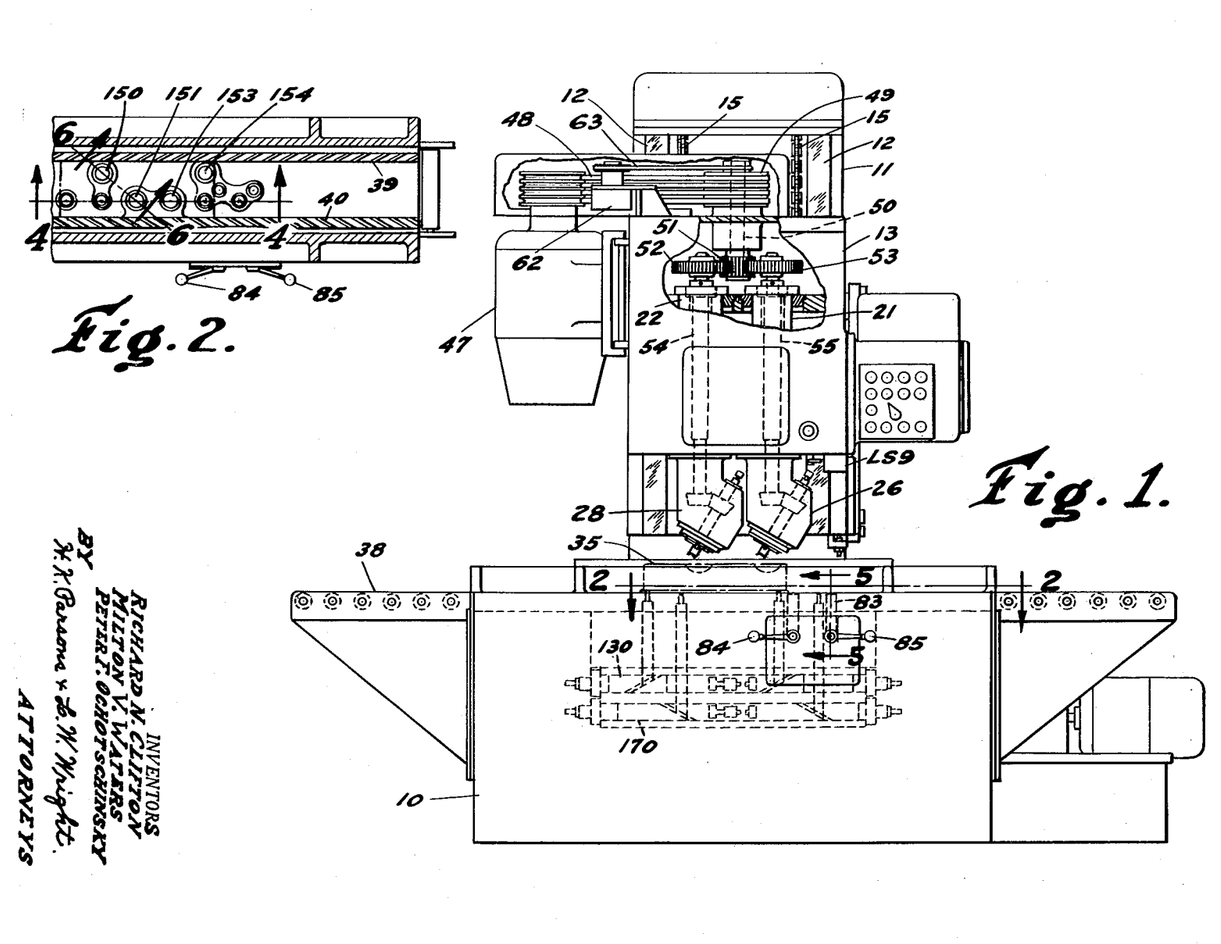
Figure 1 is a front elevational view of a machine embodying the principles of this invention.
Figure 2 is a detail section on the line 2—2 of Figure 1.

The transmission for driving the cutting tools to effect the machining operation is more particularly shown in Figures 1 and 7. The cutter spindles 25 and 27 are driven from a common motor 47 which, as shown in Figure 1 is attached to the side of the ram 13 for movement therewith. This motor is connected by suitable motion transmitting means such as a plurality of belts 48 to a pulley 49 mounted on the end of a shaft 50 journaled in the upper part of the ram 13. The lower end of the shaft 50 carries a pinion 51 which intermeshes with a pair of spur gears 52 and 53 which are keyed to the upper end of vertical shafts 54 and 55. These shafts are supported and journaled for rotation within quills 21 and 22 which themselves are also journaled for independent rotation within the ram 13. As shown in Figure 7, the lower end of shafts 54 and 55 carry bevel gears 58 and 59 respectively, which intermesh with bevel gears 60 and 61 respectively which are, in turn, attached to the cutter spindles 27 and 25. It will be noted that the cutter spindles are continuously connected to the motor so that starting and stopping of the spindles is controlled by starting and stopping the motor 47. To assist in quickly stopping the motor 47, a plugging switch 62 is connected by a belt 63 for actuation from the pulley 49.

The quills 21 and 22 are independently driven from a second electric motor 64 which, as shown in Figure 3, is attached to the ram 13 on the side opposite to the motor 47. This motor has a pulley 65 which is connected by suitable transmission means such as the belts 66 to a pulley 67 which, as shown in Figure 7, is secured to the upper end of a vertical shaft 68 that carries a worm 69. The worm intermeshes with a worm gear 70 for driving a horizontal shaft 71 which is journaled in the ram 13 and connected by spur gearing, indicated generally by the reference numeral 72 to a second horizontal shaft 73 which has a bevel pinion 74 secured to the end thereof. The bevel pinion rotates a large bevel gear 75 secured to a vertical shaft 76 that has a spur gear 77 which drives a spur gear 78 secured to the quill 22, and a second spur gear 79 which is keyed to the quill 21.

It will be noted from Figure 7 that the lower end of each quill has an enlarged head on the end thereof in which the cutter spindle is supported in a predetermined angular relation to the axis of the quill whereby upon rotation of the quill the cutter spindle axis is caused to precess about the axis of the quill and thereby cause the cutter to generate a spherical surface. Thus, a spherical surface can be generated with ordinary circular cutters. The quills are directly connected to their driving motor 64 and stopping and starting of the quills is effected by starting and stopping motor 64. To facilitate obtaining a quick stopping of the quills a plugging switch 80 is operatively connected for rotation by the pulley 67 by means of a driving belt 81.

Briefly, the automatic cutting cycle is accomplished as follows. The cutter spindles are rotating and then the ram is fed downward to its lowest position at a rapid traverse rate and then at a feed rate to permit the rotating cutters to cut to the final depth of the finished surface to be formed. The ram is stopped in this position, and the quills are started to rotate whereby the cutters as they sweep around the axis of the quills remove the necessary stock to complete generation of the desired surface. The quills are permitted to rotate slightly more than 360 degrees sufficient for the cutters to overlap on the initial surface formed, thereby producing a smooth finish. The ram is then automatically retracted, and the quills are reversed in the direction of rotation causing them to return to their starting position. When the ram has completed its return movement, it automatically stops rotation of the cutter spindles and also automatically causes unclamping of the work. This completes one automatic cycle of operation.

Figure 10:
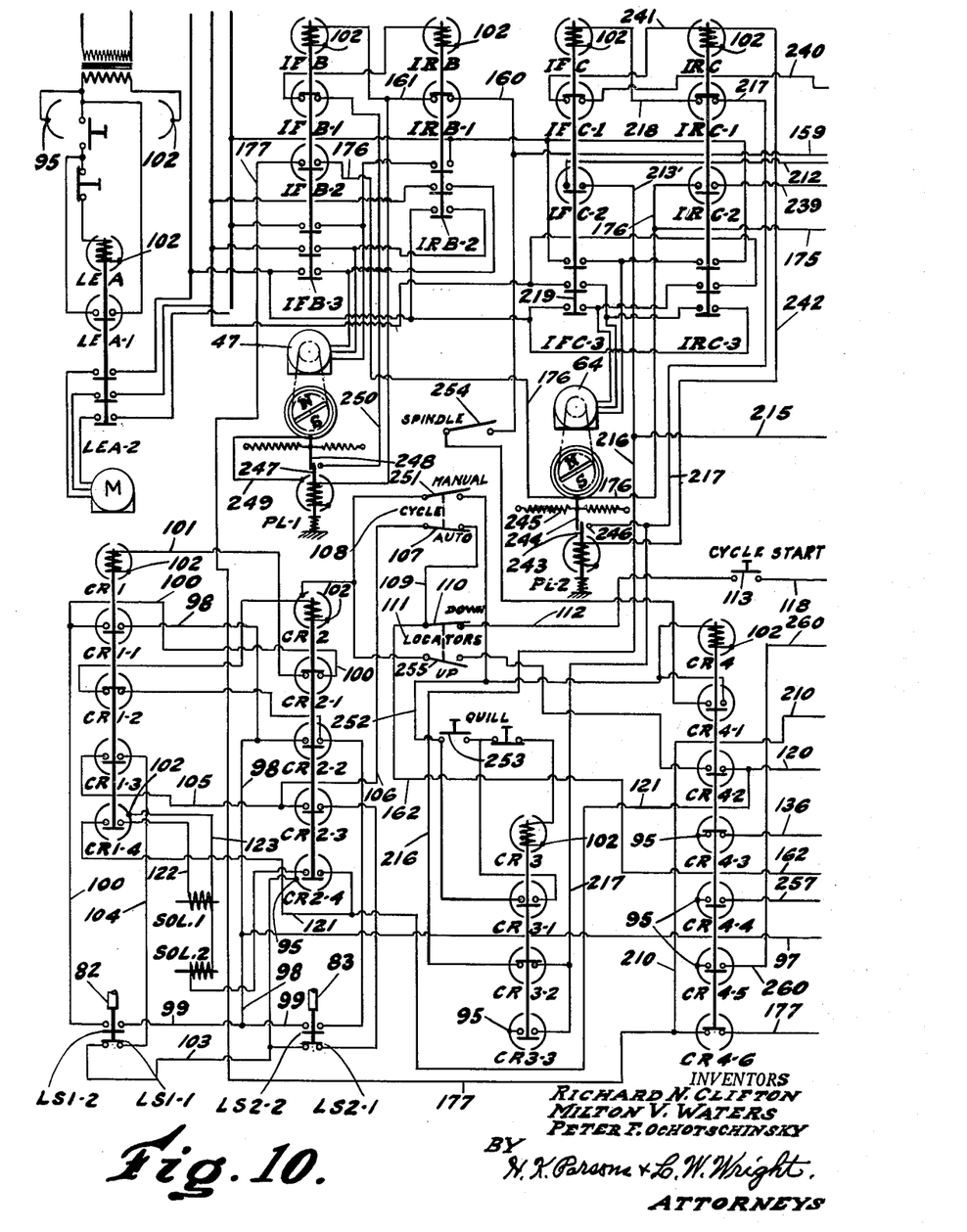
Figure 10 is a diagrammatic view of one-half of the electrical control circuit.
Figure 11:
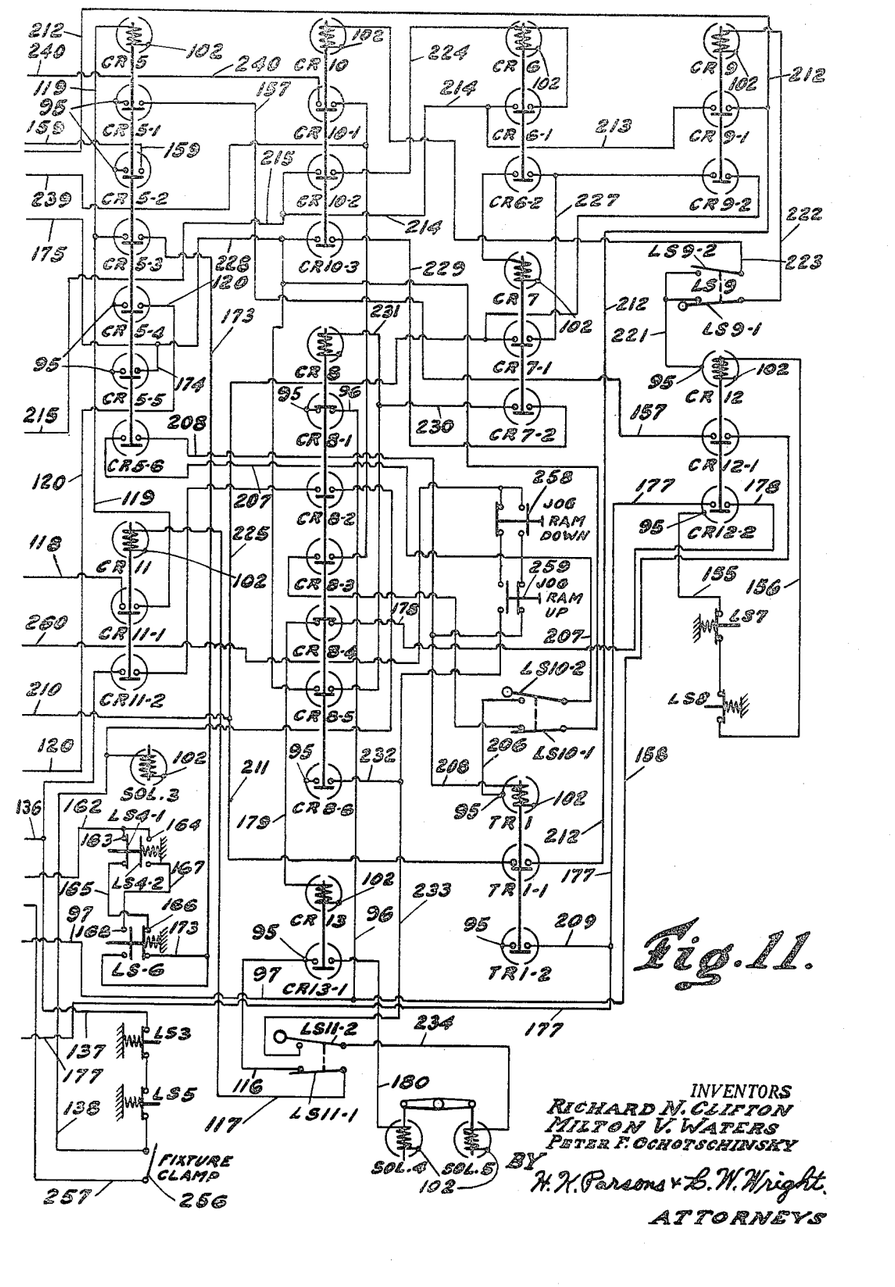
Figure 11 is a diagrammatic view of the other half of the electrical control circuit.

The automatic cycle of operation is controlled by an electrical control circuit which is shown in Figures 10 and 11 of the drawings. In order to simplify the circuit drawings, various switches have been enclosed in parentheses, and these represent in each case the two power supply lines. In other words, the left hand parentheses of a pair always represents the positive power supply and the right hand parentheses represents the negative power supply, and connections to either of these wherever necessary are represented by dots.

As a new work piece moves into the machine from the conveyor 38, it is located in a first position by a first stop 82 which is raised into position in the path of the incoming work piece as shown in Figure 4. There is a second stop 83 shown in Figure 4 for stopping the work in its second position. These stops are raised by separate control levers 84 and 85 which, as shown in Figure 1, are mounted on the front of the machine and normally are in a horizontal position which corresponds to the depressed position of the stops, and operation of the stop is effected by manually raising the lever from its horizontal position. The operating mechanism for the stop 83 is shown in Figure 5 from which it will be seen that the handle 85 is secured to the end of a shaft 86 which is rotatably mounted in a bracket 87 attached to the front of the machine. The shaft 86 has a detachable connection 87' with a shaft 88 which is journaled in the bed of the machine and has an eccentric pin 89 on the end thereof interengaging a slot 90 formed in the side of the stop plunger 83. Thus, by rotation of the handle 85, the stop 83 may be elevated to its dotted line position indicated by the reference numeral 91 in the path of the work piece 35. The operating mechanism for the stop 82 is the same as the one just described, and further description thereof is not believed to be necessary.

Figures 9, 12:
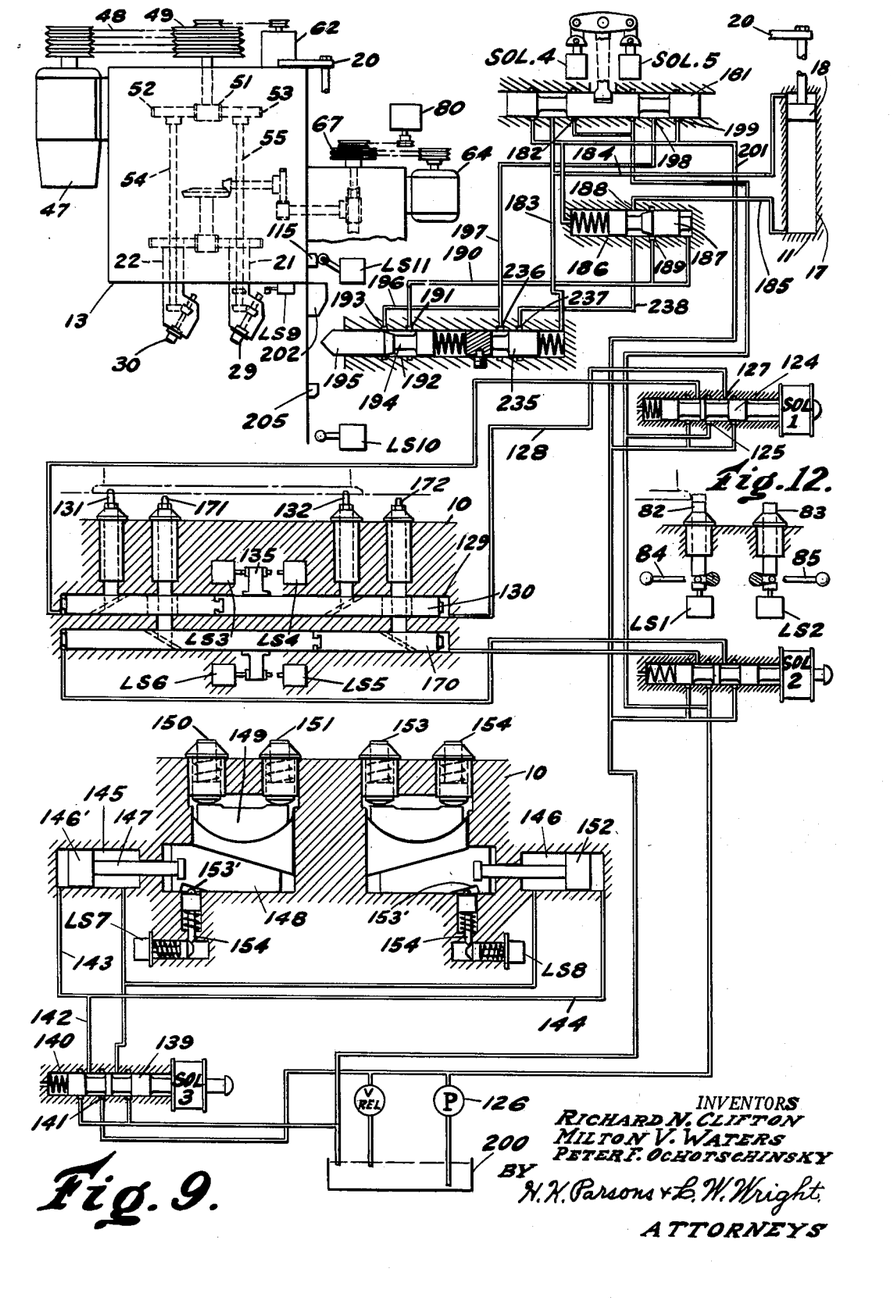
Figure 9 is a diagrammatic view of the hydraulic control circuit.
Figure 12 is a detail view showing the relation of the work stop levers and switches associated therewith.

Mounted in the bracket 87 is a limit switch LS2 which has an operating plunger 92 that is normally held in a depressed position against the resistance of spring 93 by a suitably formed cam 94 keyed to the shaft 86 when the lever 85 is in a horizontal position. Likewise, the lever 84 operates a limit switch LS1 as shown in Figure 12 of the drawings.

The limit switches LS1 and LS2 are shown in the lower left hand corner of the electrical diagram in Figure 10. The limit switch LS1 has two contactors LS1—1 and LS1—2. Since the stop 82 is the first one to be operated it will be apparent from Figure 10 that when the stop 82 is raised that contactor LS1—2 will complete its circuit and normally closed contactor LS1—1 will break its circuit. Limit switch LS1 is utilized to operate the control relay CR1 and the limit switch LS2 is utilized to operate the relay CR2, and electrical interlocks are provided whereby when one relay is energized it is impossible to energize the other.

The limit switches derive their current from relay CR8 shown in the middle of Figure 11. The relay CR8 has a normally closed contactor CR8—1 which, when the relay is deenergized, connects the positive power supply 95 to conductor 96 and the current flows from there through conductors 97, 98 to line 99 which is connected in parallel to both of the limit switches LS1 and LS2. Thus, by operating the limit switch LS1, the power supply line 99 is connected by contactor LS1—2 to line 100 which leads to the normally closed contact CR2—1 of relay CR2.

When relay CR2 is deenergized, its contactor CR2–1 connects line 100 to line 101 which terminates in relay CR1, the other end of the relay coil being connected to the negative power supply line 102. The relay CR1 latches itself in by closing its contactor CR1-1, which connects the power line 98 directly to line 100, thus short circuiting the switch LS1-2. The operation of relay CR1 also opens its normally closed contact CR1-2, thereby breaking the circuit connection to relay coil CR2, preventing its operation while relay CR1 is energized. The relay CR1 has two more contactors CR1-3 and CR1-4 which are closed by operation of the relay, the former contactor setting up a potential circuit to a cycle start button, and the other contactor setting up a potential circuit to solenoid SOL-1, which operates a valve in the hydraulic circuit shown in Figure 9.

Since the contact CR1–3 and CR1–4 are held closed by the latching of relay CR1 the potential circuits established thereby are actually completed by the operator lowering the lever 84. This opens limit switch LS1–2 and closes LS1–1 completing a circuit from the power supply 95 through line 103 to line 104, closed switch CR1–3, lines 105 and 106, closed conact 107 of cycle selector switch, indicated generally by the reference numeral 108, line 109, closed contact 110 of selector switch 111, line 112, to cycle start button 113.

At this point it is necessary to point out that in the starting position of the machine the ram 13 is in an elevated position and, as shown in Figure 3, the ram carries a dog bar 114 upon which is mounted a dog 115 which in the elevated position of the ram operates the limit switch LS11 and holds it in the operated position. The limit switch LS–11 is shown at the bottom of Figure 11, and its contactor LS11–1 is held closed by the trip dog 115. When the power is turned on to the electrical circuit it will be seen that the power supply 95 is connected by line 116 to the contactor LS11–1 whereby current flows through line 117 to relay CR11 and then to the negative power line 102. This causes operation of relay CR11 and closes its two contactors CR11–1 and CR11–2. The closing of CR11–1 makes it possible for the cycle start button 113 to complete a circuit from line 112 through line 118, contactor CR11–1 and line 119 to relay CR5. Energization of this relay will close its contactor CR5–4, completing a circuit from power line 95 through lines 120 and 121 to contactor CR1–4 of relay CR1 and line 122 to solenoid SOL–1. The circuit is completed through line 123 to power line 102.

Referring to Figure 9, work locator control solenoid SOL–1, connected to valve 124, is shown in its energized position whereby the valve plunger 124 is positioned to connect the pressure port 125, which is supplied by pump 126, to port 127 and line 128 to cylinder 129. This moves the plunger 130 in a direction to elevate the first pair of work locators 131 and 132. These are shown more in detail in Figure 4 from which it will be seen that the plunger 130 has inclined cam tracks 133 and 134 whereby upon movement of the plunger 130 to the left, the locators will be elevated.

The plunger 130 carries a trip dog 135 which, as it moves to the left as viewed in Figure 9, closes limit switch LS3, which is shown at the bottom of Figure 11 in series with the limit switch LS5. The limit switch LS3 derives its power from the normally closed contact CR4–3 of relay CR4, Figure 10, whereby power flows from the power line 95 through normally closed switch CR4–3 and line 136 to line 137. When both limit switches LS3 and LS5 are closed as shown in Figure 11, the current flows through line 138 to work clamp operating solenoid SOL–3. When the limit switch LS3 is open, it breaks the circuit to SOL–3, and this solenoid is shown at the bottom of Figure 9. Deenergization of the solenoid causes the connected valve plunger 139 to be moved to the right by its operating spring 140, thereby connecting the pressure port 141, supplied by pump 126, to line 142 which has branch connections 143 and 144 to clamp operating cylinders 145 and 146. The cylinder 145 has a piston 146′ which is connected by a piston rod 147 to a bevel block 148 which upon movement to the right elevates the equalized clamping plunger 149 which operates the two clamping members 150 and 151. Similarly, the piston 152 in cylinder 146 operates a second pair of work clamping plungers 153 and 154. Operation of the clamping mechanism releases limit switches LS7 and LS8 which were held in an operated position by bevel surfaces 153′, depressing spring pressed plungers 154 which are operatively connected to the limit switches. These limit switches are shown on the right hand side of Figure 11 and are normally held in an open position by the clamp mechanism but upon actuation of the clamps to secure the work, these switches are closed by their springs, thereby completing a circuit from power line 95 through line 155 and line 156 to operate relay CR12, and close its contacts CR12–1 and CR12–2.

The closing of switch CR12–1 completes a circuit from switch CR5–1, which was closed by operation of relay CR5 from the power source 95 through line 157 to closed switch CR12–1, line 158 to line 97, thus forming a parallel power connection thereto with line 96 so that normally closed switch CR8–1, which connects power to line 47, may subsequently be opened without breaking the latching circuit to relay CR1.

Switch CR5–2 which was closed by the operation of relay CR5 establishes a power circuit to cause rotation of the spindle. This switch connects the power source 95 with line 159 that connects with line 160 that leads to the normally closed switch IRB–1 of relay IRB, top of Figure 10. The switch IRB–1 is normally closed, connecting line 160 with line 161 that terminates in the spindle starting relay IFB. Operation of this relay closes the three wire starting switch IFB–3 to the spindle motor 47.

The switch CR5–3 completes a latching circuit to relay CR5. The current for this latching circuit is derived from the line 109, middle of Figure 10, which supplies current to the starting button 113 and has a branch connection 162 leading to limit switch LS4, Figure 11, and terminates in parallel contacts 163 and 164. 163 is connected by limit switch LS4–1 to line 165 terminating in contact 166 of limit switch LS6. The limit switch LS4–2 serves to connect contact 164 through line 167 to contact 168 of limit switch LS6.

From Figure 4 of the drawings it will be seen that, when the first pair of locators are elevated, limit switch LS4 is released and at the same time the limit switch LS6 is held closed by the dog 169 carried by the plunger 170 that elevates the second pair of locators 171 and 172. Since limit switch LS4 is released it is in the position shown in Figure 11, and the limit switch LS6 is shown in its dog operated position, thereby establishing a circuit from contact 166 to line 173 which leads to CR5–3 and is connected thereby to line 119 and relay coil CR5. This maintains a latching circuit to relay CR5 independent of line 118 whereby the manually operated starting button 113 may be released without effecting the circuit.

A circuit to start the downward movement of the ram is established as follows. Closing of switch CR5–5 connects the power line 95 through lines 174, 175, and 176 to contactor IFB–2 of starting relay IFB, Figure 10, which is closed with the starting of the spindles, thus connecting line 176 to line 177 which extends all the way to contactor CR12–2, Figure 11, of relay CR12, which was energized by operation of the work clamps. The closing of this contactor connects line 177 to line 178 which extends to normally closed contactor CR8–4 of relay CR8 which is closed at this time to connect line 178 to line 179 and thereby to relay CR13. Operation of this relay closes contact CR13–1 connecting the power source 95 to line 180 and thereby to ram control solenoid SOL–4.

As shown in Figure 9, the operation of solenoid SOL–4 shifts the ram control reversing valve plunger 181 to the right as viewed in Figure 9, thereby connecting the pressure port 182, which is supplied by the pump 126, to line 183 and line 184 to the upper end of cylinder 17. This causes the piston 18 to move the ram down through the mechanical connections shown in Figure 3.

Summarizing up to this point, it will be seen that manual operation of one of the work stop levers positions a mechanical stop and operates a limit switch which causes insertion of the work locators in the work. The circuit established by the limit switch is automatically electrically latched so that the lever may be returned to set up another circuit to the cycle start button. The work locators automatically actuate other limit switches which set up a circuit to actuate the work clamps. Operation of the cycle start button starts the spindles rotating and completes a circuit interlocked with the work clamping and the spindle rotation to start the downward movement of the ram. Thus, the ram starts to move down with the work properly located and clamped and with the cutter spindle rotating.

As the piston 18 moves downward, fluid is exhausted from the cylinder through channel 185 to the pressure relief valve indicated generally by the reference numeral 186. The plunger 187 of this valve connects the port 188 to the throttling port 189 which is connected by channel 190 to port 191 of the rate control valve indicated generally by the reference numeral 192. This valve also has a throttling port 193 which is connected by the groove 194 in the valve plunger 195 to port 191. The port 193 is connected by channel 196 and 197 to port 198 of the reversing valve 181 which is now in position to connect the port 198 to the exhaust port 199 whereby the fluid will return to the reservoir 200 through channel 201.

The two throttling ports 189 and 193 permit a relative fast downward movement of the ram until the rate control dog 202 carried by the ram as shown in Figure 3 engages the plunger 195, thereby causing further restriction of the throttling port 193 and reducing the rate of the ram to a feed rate so as to permit the cutters to start cutting through to the necessary depth in the work. The ultimate depth of cut is determined by a positive stop mechanism shown in Figure 3, comprising the stop member 203 which is fixed to the ram, and an adjustable stop screw 204 which is suitably threaded in the column in the path of movement of the member 203. It should also be noted that as the ram moves down, the dog rail 114 travels with it whereby the dog 115 releases limit switch LS11, and dog 205 will engage limit switch LS-10.

The important effect at this time is that limit switch LS10—2 closes, completing a circuit from the power source 95 through line 206, 207, closed switch CR5—6 of relay CR5 and line 208 to timer relay coil TR1. Contact TR1—2 immediately closes and connects the power source 95 through line 209, line 177 and switch CR12—2 to latch in relay CR13 previously energized to start the ram. The other contact TR1—1 of the timer relay has a delayed closing to give the cutters time to clean up the surface they are working on and then to cause rotation of the quill motor by operation of starter relay 1FC.

Figure 8:
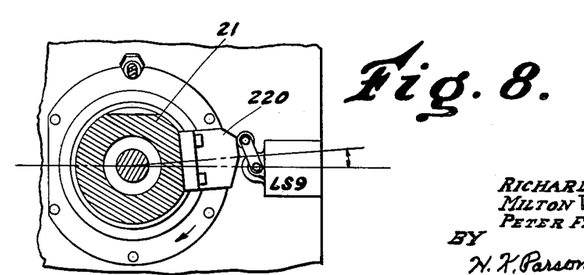
Figure 8 is a section on the line 8—8 of Figure 7.

The power for this comes from line 177 supplied by TR1—2 through branch line 210 and 211 to contactor TR1—1 and then through line 212, closed contact CR9—1 of relay CR9, lines 213, 214, 215, 216, to normally closed contactors CR3—2 of relay CR3, line 217 to normally closed contactor IRC—1 of relay IRC and line 218 to quill starting relay IFC. Operation of this relay closes the three wire contacts 219, connecting power to the quill motor 64. Attention is invited to the fact that the quill 21, as shown in Figures 7 and 8, has a dog 220 attached thereto, which at starting is in a position to hold the limit switch LS9 operated so that the contactor LS9—1, shown on the right side of Figure 11, is closed and connects the power source 95 through line 221 to line 222 holding the relay CR9 energized whereby its contact CR9—1 is closed as just explained.

It will now be seen that the quills will start to rotate and cause the cutters to generate the spherical cavities in the work piece. As the quill rotates, the dog 220 moves out of engagement with the limit switch LS9 whereby the contactor LS9—1 will open and deenergize relay CR9 and at the same time contact LS9—2 will close, completing circuit from the power source 95 through line 223 to relay CR10. Operation of this relay will close contact CR10—2. When the starting relay IFC was energized it closed its contactor IFC—2, establishing a circuit from line 212 which was energized by the timer relay TR1, as just explained, to line 213' and thereby to line 215 to the closed contact CR10—2 of relay CR10 and through line 224 to relay coil CR6.

Operation of relay CR6 closes its latching contact CR6—1 which connects power from line 215 to relay CR6 independent of relay CR10. A second contact CR6—2 is also closed which sets up a circuit to relay CR7 from contactor CR9—2 of relay CR9.

After the quill has rotated about 355 degrees the dog 220 shown in Figure 8 again engages the limit switch LS9, causing switch LS9—2 to open and deenergizes relay CR10, and switch LS9—1 to close and energize relay CR9. The operation of relay CR9 closes its contact CR9—2, thus completing the circuit to relay CR7, causing operation thereof. This relay is latched in by the closing of its contact CR7—1 connecting power from line 210 through line 225 and 227 and closed contact CR6—2, thus maintaining the relay energized independent of relay CR9. The quill continues to rotate approximately another ten degrees at which time the dog 220 shown in Figure 8 again moves out of engagement with limit switch LS9. LS9—2 again closes, energizing relay CR10, and LS9—1 opens, deenergizing relay CR9. This time the closing of contact CR10—3 completes a power circuit from closed contact CR5—5 of relay CR5 through lines 228, 229, closed contact CR7—2 of relay CR7, line 230 and line 231 to relay coil CR8. Operation of this relay opens its normally closed contact CR8—4, breaking the circuit to relay CR13, which, in turn, breaks the circuit to solenoid 4. The valve plunger 181 of the reversing valve returns to neutral by means of its centering springs. Contact CR8—6 is also closed by operation of relay CR8, thereby connecting power through line 232, line 233, closed limit switch LS11—2 and line 234 to ram reversing solenoid SOL5.

The energization of solenoid 5 as shown in Figure 9 shifts valve plunger 181 to the left, thereby connecting fluid pressure to the lower end of cylinder 17, raising the ram. In other words, the pressure from the pump is connected to port 198 and channel 197. It is desirable to raise the ram quickly which cannot be accomplished if the fluid pressure flows through the throttle port 193. Therefore, the valve plunger 235 is provided whereby the fluid pressure in line 197 can act on the left hand end of valve 235, moving it to the right and interconnecting port 236 with port 237 whereby the fluid will flow through line 238 and 185 directly to the lower end of the cylinder. As soon as the ram starts to move up it releases limit switch LS10 as seen in Figure 3, and this closes contact LS10—2 and opens contact LS10—1. The opening of LS10—2 opens the circuit through contactor CR5—6 of relay CR5 to the timer relay TR1. This results in the opening of its contacts TR1—1 and TR1—2. The opening of TR1—1 breaks the circuit to starter relay IFC of the quill motor whereby the quill will coast. The closing of switch LS10—1 completes a circuit to the reversing relay coil IRC for the quill through switch CR8—3, CR10—1 and normally closed switch IFC—1 of starter coil IFC, it being noted that the reversing coil cannot be operated until the starting coil has been deenergized to close IFC—1. This causes reverse rotation of the quill. The relay coil IRC latches itself in by closing contact IRC—2, completing a circuit from contactor CR5—5 through line 175, IRC—2, line 239, and contactor CR10—1 to line 240 which is connected through the closed contactor IFC—1 to line 241 and thereby to the reversing relay coil IRC.

Since the quill has now reversed its direction of rotation, the trip dog 220 shown in Figure 8 will again engage the limit switch LS9. This will result in the opening of its contact LS9—2, thereby breaking the circuit to relay CR10. Since the circuit to the reversing relay coil IRC passed through CR10—1 the deenergization of relay CR10 breaks the circuit to the relay coil IRC, thereby stopping the reverse rotation of the quill.

When the quill is reversed as just explained it is plugged to a stop by a plugging switch to insure that when the quill stops the control dog will be in engagement with the limit switch LS9. This is illustrated diagrammatically in Figure 10 by connecting the line 241 that supplies power for energization of the reversing coil IRC to line 242 which goes to the operating coil of the plugging switch PL2. When this coil is energized, it withdraws a plunger 243 from the path of an operating finger 244 which is magnetically driven by the motor 64 and normally centralized by springs 245. When the plunger 243 is withdrawn, the finger 244 which is connected to power line 176 closes contact 246 and thereby to line 217 which energizes the forward starting coil of the quill motor sufficiently to momentarily reverse the motor and plug the motor to a stop.

When the ram completes its upward movement it operates limit switch LS11 which opens the circuit through line 234 to the solenoid SOL—5, thereby repositioning the valve plunger 181 in its central or neutral position, stopping the movement of the ram. At the same time LS11—1 energizes relay CR11 which causes operation of solenoid SOL—3, resulting in unclamping of the work by the operation of the hydraulic valve 139 shown at the bottom of Figure 9.

When the work is unclamped, the limit switches LS7 and LS8 are opened, deenergizing relay CR12. CR12 causes deenergization of CR1 and CR1 causes deenergization of relay CR5 and CR5 causes deenergization of relays CR6, CR7, and CR8. Relay CR5 also opens the circuit to the cutter spindle, starting relay IFB, stopping the spindle. This is also plugged to a stop by a plugging relay PL1. In other words, the plugging coil is maintained energized through line 161, thereby holding the stop finger 247 in the path of contactor 248 which is magnetically urged toward the right so that upon withdrawal of the plunger 247 power through the line 249 is connected to line 250 and contact IFB—1 which is closed upon deenergization of relay coil IFB, momentarily completing a circuit to reversing relay coil IRB.

The deenergization of relay coil CR5 and CR1 result in the deenergization of solenoid SOL—1 which, as shown in Figure 9, causes the hydraulic valve 124 to shift and effect automatic retraction of the work locators. This results in release of limit switch LS3 whereby it will be seen from Figure 11 that LS3 and LS5 are both closed, thereby maintaining a circuit to solenoid SOL—3 to hold the work clamping members in a released position whereby the operator may move the work piece to its second position and manually operate the control lever 85 to elevate the second pair of locators and position the work in its second position for execution of another operating cycle to mill another pair of concavities in the work.

This time, limit switch LS2 will be operated to cause actuation of relay CR2 which will energize SOL—2 to effect insertion of locators 171 and 172 instead of 131 and 132. This will locate the work in its second position and limit switches LS4 and LS6 will function to effect clamping of the work, and the rest of the cycle will continue as before.

Provision has been made for manual control of certain parts of the mechanism, but first the manual control selector switch 108 must be operated to close switch 251 and open automatic cycle switch 107. This connects power to line 252 whereby the manual control switch 253 may be operated to jog the quill. Relay CR4 connects power to the spindle control switch 254, which may be utilized to cause rotation of the spindle at will. By closing switch 255 either set of work locators may be operated by selective utilization of the control levers 84 and 85.

Manual control of work clamping is effected by the fixture clamp switch 256 which receives power through line 257 from relay CR4.

The ram is individually controlled by switches 258 and 259 which also receive power from relay CR4 through line 260.

There has thus been provided a machine for milling spherical concavities in work with a circular milling cutter by mounting the cutter for rotation about an axis at an angle to the vertical axis of the concavity and generating the work by precessing the cutter about said vertical axis. The cycle control mechanism is so arranged that the cutting cycle is effected automatically so that the operator's duties are reduced to loading and locating the work in the machine and starting the cycle, the machine automatically coming to a stop and unclamping the work when a cycle has been completed.

What is claimed is:

1. A machine for generating a spherical concavity in the surface of a workpiece about an axis of generation intersecting said surface comprising a work support, means supporting a slide for movement toward and from the work support parallel to said axis, a hollow quill journaled in said slide having an axis of rotation, said quill terminating in a spindle housing, a cutter spindle journaled in said housing at an angle to and crossing said quill axis, a cutter attached to one end of said spindle on one side of said axis, a drive gear attached to the other end of spindle on the other side of said axis, said cutter having a cutting circle tangent to said quill axis and with its plane inclined to said axis, a drive shaft journaled within said quill for independent rotation, means operatively connecting said drive shaft to said drive gear for imparting rotation to the spindle, power means carried by the slide for actuating said drive shaft, and additional power means carried by the slide for rotating said quill through one revolution at a slow rate.

2. A machine for generating a spherical concavity in the surface of a workpiece about an axis of generation intersecting said surface comprising a work support, means supporting a slide for movement toward and from the work support parallel to said axis, a hollow quill journaled in said slide having an axis of rotation, said quill terminating in a spindle housing, a cutter spindle journaled in said housing at an angle to and crossing said quill axis, a cutter attached to one end of said spindle on one side of said axis, a drive gear attached to the other end of spindle on the other side of said axis, said cutter having a cutting circle tangent to said quill axis and with its plane inclined to said axis, a drive shaft journaled within said quill for independent rotation, means operatively connecting said drive shaft to said drive gear for imparting rotation to the spindle, power means carried by the slide for actuating said drive shaft, additional power means carried by the slide for rotating said quill through one revolution at a slow rate, hydraulic means for advancing and retracting said slide, including a start and stop control valve, and means trip operable by the slide during advance thereof to automatically actuate said stop valve and initiate slow rotation of said quill by said additional power operable means.

3. A machine for generating a spherical concavity in the surface of a workpiece about an axis of generation intersecting said surface comprising a work support, means supporting a slide for movement toward and from the work support parallel to said axis, a hollow quill journaled in said slide having an axis of rotation, said quill terminating in a spindle housing, a cutter spindle journaled in said housing at an angle to and crossing said quill axis, a cutter attached to one end of said spindle on one side of said axis, a drive gear attached to the other end of spindle on the other side of said axis, said cutter having a cutting circle tangent to said quill axis and with its plane inclined to said axis, a drive shaft journaled within said quill for independent rotation, means operatively connecting said drive shaft to said drive gear for imparting rotation to the spindle, power means carried by the slide for actuating said drive shaft, additional power means carried by the slide for rotating said quill through one revolution at a slow rate, hydraulic means for advancing and retracting said slide, including a start and stop control valve, means trip operable by the slide, during advance thereof to automatically actuate said stop valve and initiate slow rotation of said quill by said additional power operable means, and means trip operable by the quill upon completion of one revolution to reverse the quill and intiate retraction of the slide.

References Cited in the file of this patent

UNITED STATES PATENTS

| | | |
|---|---|---|
| 753,911 | Pelstring | Mar. 8, 1904 |
| 1,634,322 | Dornes, Jr. | July 5, 1927 |
| 2,142,029 | Horlacher | Dec. 27, 1938 |
| 2,340,210 | Armitage et al. | Jan. 25, 1944 |
| 2,434,751 | Trecker et al. | Jan. 20, 1948 |
| 2,458,597 | Hoier et al. | Jan. 11, 1949 |
| 2,499,210 | Armitage | Mar. 7, 1950 |